Nov. 2, 1948.  W. L. McGRATH  2,453,095

PLURAL STAGE REFRIGERATION SYSTEM AND CONTROL THEREFOR

Filed July 19, 1943  3 Sheets-Sheet 1

Inventor
WILLIAM L. McGRATH
By
George N. Fisher
Attorney

Nov. 2, 1948. W. L. McGRATH 2,453,095
PLURAL STAGE REFRIGERATION SYSTEM AND CONTROL THEREFOR
Filed July 19, 1943 3 Sheets-Sheet 2

Inventor
WILLIAM L. McGRATH
By
George H. Fisher
Attorney

Patented Nov. 2, 1948

2,453,095

UNITED STATES PATENT OFFICE 2,453,095

PLURAL STAGE REFRIGERATION SYSTEM AND CONTROL THEREFOR

William L. McGrath, Philadelphia, Pa., assignor to Minneapolis-Honeywell Regulator Company, Minneapolis, Minn., a corporation of Delaware Application July 19, 1943, Serial No. 495,246

20 Claims. (Cl. 62—115)

Multiple stage refrigeration systems have long been used to reach temperatures lower than can be attained by a single stage, but there is a demand at present for systems that will not only refrigerate to very low temperatures but which will also give controllable cooling over an extensive range of temperature from the lowest obtainable by the equipment up to room temperatures. Refrigeration systems of this sort are particularly useful in chemical and metallurgical practice, for research, and for testing instruments and other equipment used in aviation. Further, even in such common uses as cold storage, the refrigeration equipment is required to be flexible in capacity, due to the varying kinds and quantities of material that may be handled, efficient as possible at any capacity and accurately controllable at any chosen control point. Optimum storage temperatures for various products vary considerably and many products require an initial curing temperature, a storage temperature, and in some cases, a finishing off temperature. Highly accurate control permits close adherence to optimum temperatures and often permits prolonging the storage period for months. Obviously, these are merely examples to illustrate the utility of refrigeration systems of the sort about to be described.

It is therefore an object of the present invention to provide an improved and readily controlled plural stage refrigeration system.

It is a further object to so control a plural stage refrigeration system that only the required amount of refrigeration, at any chosen control point, will be furnished, thereby saving power and facilitating the control of the equipment.

Another object of this invention is to control a plural stage refrigeration system by throttling each stage of the system as it is placed into operation thereby giving regulation of the system from zero to one hundred per cent of its capacity.

It is another object of this invention to provide a system of control comprising fluid means to operate a controlled device from one extreme position to its opposite extreme and then back to said first extreme in a gradual manner as a modulating controller moves from one of its extreme positions to its other extreme position.

It is also one of the present objects to provide an improved plural stage refrigeration system composed of standard equipment, thus permitting economies in the purchase of the equipment and facilitating installation and servicing. Further, because of the excellent control provided, the lower pressure units may be constructed and powered for their normal operation as they are not put in operation until conditions are favorable, thereby eliminating the need for unduly large motors.

It is well known that the cooling abilities of the refrigerator evaporator depend on the quantity of refrigerant pumped through same and upon the pressure conditions under which it is pumped. Thus, it is an object of this invention to control the capacity of a refrigeration system by controlling the pumping of refrigerant.

It is a further object to control the pumping of a fluid in a plural stage pumping system by operating the pumping units in sequence and sequentially controlling by-passes around certain of the pumping units.

It is still another object to provide a system of control for plural stage refrigeration systems having a plurality of evaporators with individual control for each evaporator.

It is a further object of this invention to provide a plural stage refrigeration system which may be controlled by electric or pneumatic means, or by a combination of such means.

These and other objects will become apparent upon a study of the drawings and specification of the present invention.

Figure 1:
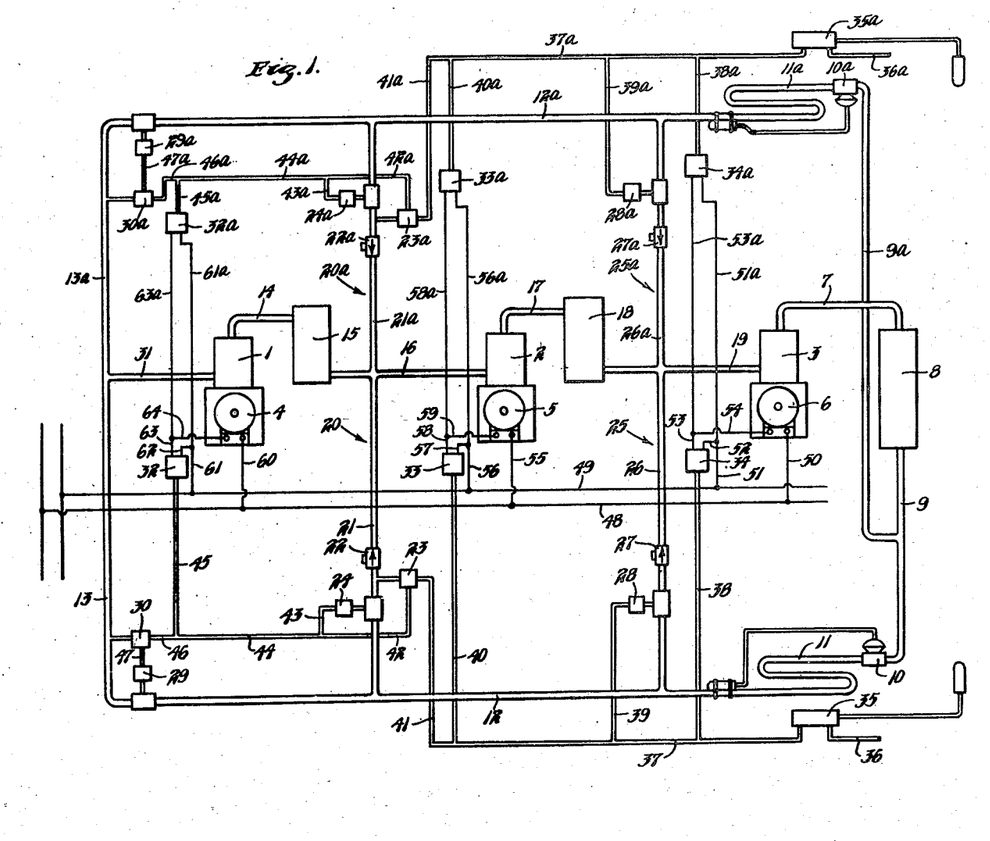
Figure 1 is a schematic view of a three stage plural evaporator refrigeration system controlled by pneumatic means.

Referring to Figure 1 it is noted that three compressing units are used to supply the evaporators, the evaporators being individually controlled by a control system comprising pneumatic means. However, it should be noted that the figure is illustrative only and that two or more compressor units may be used and the mode of controlling the flow of refrigerant through the evaporators, which may number one or more, is immaterial so long as the control is in the proper sequence and is of the sort to be described.

In Figure 1 compressors 1, 2, and 3, driven by motors 4, 5, and 6, are connected in series, compressor 1 being the lowest pressure unit in the series and compressor 3 the highest. Compressor 3 discharges through pipe 7 into condenser 8 from which refrigerant is delivered through pipes 9 and 9a to expansion valves 10 and 10a and associated evaporators 11 and 11a, respectively. As the piping and the controls relating to evaporator 11a are similar to and function in the same manner as the like parts relating to evaporator 11, the refrigerant and control circuits of evaporator 11 only will be discussed, it being understood that the "a" numbered parts are similar and function the same as the like numbered parts not having the "a." This should not be construed, however, to mean that all the parts must have the same capacity as the similar part, for evaporator 11a may be of different capacity than evaporator 11 and additional evaporators similar to 11 and 11a and of still different capacities may be connected in the same manner as the evaporators shown. Obviously, as evaporators 11 and 11a are individually controlled they may, at any particular time of operation of the system, be operating under different conditions. This will be brought out and made clear in the operation schedule which follows this description. From evaporator 11, refrigerant flows through pipes 12, 13, and 31 to compressor 1, said compressor 1 discharging through pipe 14, intercooler 15, and pipe 16 to the suction of compressor 2. Compressor 2 discharges through pipe 17, intercooler 18, and pipe 19 to the suction of compressor 3, said compressor 3 discharging as before mentioned. A by-pass 20 is provided between pipe 12 and pipe 16 and comprises pipe 21, check valve 22, pressure control 23 and modulating valve 24, said valve being normally closed and said check valve 22 permitting flow from pipe 12 to pipe 16 only. A by-pass 25 is provided between pipe 12 and pipe 19, said by-pass 25 comprising pipe 26, check valve 27 and modulating valve 28, said valve being normally closed and said check valve permitting flow from pipe 12 to pipe 19 only. A normally closed modulating valve 29 is provided in suction line 12 between by-pass 20 and pipe 13. A pressure control 30, to govern the action of modulating valve 29, is inserted in suction line 13 between valve 29 and compressor 1.

Motors 4, 5, and 6 are controlled by pressure switches 32, 33, and 34, respectively, the pressure switches being controlled by a control system incorporating thermostatic or other such means 35, said means 35 being supplied with air under pressure by pipe 36. Thermostatic means 35 regulates the pressure in branch pipe 37 in accordance with the demand for refrigeration as determined by said device 35. Branch control pipe 37 connects to pressure switch 34 by tube 38, and modulating valve 28 is connected to said branch by tube 39. Tube 40 connects said branch 37 to pressure switch 33, and tube 41 connects said branch to pressure controller 23. Tube 42, under control of controller 23, extends from same and connects to modulating valve 24 by tube 43, connects to pressure switch 32 by tubes 44 and 45, and connects to pressure controller 30 by tube 46. Pressure controller 30 is connected to, and in control of, modulating valve 29, through tube 47. As before stated, the recitation of the refrigerating units and the control system has been given for that relating to evaporator 11 only, and it is understood that similar parts bearing similar numbers including "a" relate in the same manner to evaporator 11a, and that other evaporators may be connected to the system in the same manner, and controlled in like fashion, as said evaporators 11 or 11a. Further details of the control and operation of the above described system will be brought out and made more clear in the following operation schedule.

*Operation of Figure 1*

Under stand-by conditions, compressors 1, 2, and 3 are idle, the air pressure in branches 37 and 37a, is zero and the pressure of the air supply is 15# per square inch. Upon a demand for refrigeration, as determined by thermostat 35, the air pressure in branch 37 is increased by the action of said thermostat 35. At a one pound pressure in branch 37, pressure switch 34 is actuated and starts motor 6 by the circuit: wire 49, wire 51, wire 52, switch 34, wire 53, wire 54, motor 6, wire 50, and wire 48, thus placing compressor 3 in operation. As before stated, valves 28, 24, and 29 are each normally closed but are opened in response to sufficient air pressure. Valve 28 is opened by pressures from one to five pounds, being fully open at five pounds per square inch pressure. At one pound pressure in branch 37, valve 28 is still closed but is about to open, valves 24 and 29 remain closed and compressor 3 is running under conditions tending to produce a vacuum in by-pass pipe 26 and pipe 19. With an increase in air pressure to two pounds in branch 37, valve 28 is opened partially and compressor 3 operates under conditions of light loading due to its suction being throttled by said valve 28. With a pressure in the branch of five pounds, valve 28 is open and refrigeration is provided to the full capacity of compressor 3 when operating alone.

When the branch air pressure, due to refrigeration demands at evaporator 11, and as determined by thermostat 35, rises to six pounds per square inch, pressure switch 33 is actuated, starting motor 5 as follows: wire 49, wire 56, wire 57, switch 33, wire 58, wire 59, motor 5, wire 55, and wire 48. Thus compressor 2 is placed in operation. As before stated, valve 24 is normally closed and is under control of pressure controller 23, said valve 24 being set to start opening at six pounds per square inch pressure and being fully opened at ten pounds per square inch pressure. Hence, with six pounds per square inch pressure in branch 37, compressors 2 and 3 are operating, valve 28 is wide open and valve 24 is ready to open, and the system's capacity is that due to the operation of compressor 3 alone. Compressor 2 has added no capacity to the system due to its closed suction line. As the pressure in branch 37 rises above six pounds per square inch, valve 24 is proportionately opened and compressor 2 assumes increased load. The load on compressor 2 increase until the pressure rises to ten pounds in branch 37 and valve 24 is fully opened, at which point said compressor is loaded, as is compressor 3, and the system's capacity is that obtainable from the two compressors running together. As the pumping capacity of compressor 2 is increased there is a tendency for refrigerant to pass through by-pass 25 and into suction line 12 but this is prevented by check valve 27 which, as before stated, permits flow from pipe to 19 only. Pressure controller 23 is set to permit opening of valve 24 only when conditions of pressure in pipes 21 and 16 are such as to permit safe operation of compressor 2.

With an increase in branch pressure to eleven pounds per square inch, compressor 1 is started by pressure switch 32 as follows: wire 49, wire 61, wire 62, switch 32, wire 63, wire 64, motor 4, wire 60, and wire 48. As before noted, pressure switch 32 is actuated by air pressure from branch 37 through tube 41, pressure controller 23, tube 42, tube 44 and tube 45, hence the action of pressure switch 32 is under the control of pressure controller 23; therefore, compressor 1 cannot be started unless pressures existing in pipe 16 and 21 are such as to permit safe operation of compressor 2. As before noted, the suction of compressor 1 is controlled by modulating valve 29, which is normally closed, hence compressor 1 also starts up under conditions of negligible load.

As the pressure in branch 37 rises to fifteen pounds per square inch, valve 29 is driven toward open position and compressor 1 assumes added load until, at said maximum control pressure, all three of the compressors are operating at full load and the system's capacity is at a maximum. Check valve 22 prevents reverse flow through by-pass 20. Pressure control 30 prevents valve 29 from opening until pressure conditions in pipes 13 and 31 are low enough to permit safe operation of said compressor 1.

In this operation schedule it has been assumed that there was no demand on evaporator 11a, as determined by thermostat 35a, but it should be noted that the system may be started up and its capacity varied to meet the demand of evaporator 11a in the same manner as before described. Further, it will be noted that with a demand in more than one evaporator at the same time the refrigerating system comprising the compressors will operate to supply the maximum demand, the refrigerant flowing through evaporators having a lesser demand being throttled to meet the demand of said evaporator. Assume that the demand at evaporator 11, as measured by thermostat 35, is such as to require the operation of all three compressors, and that an initial demand has become apparent at thermostat 35a, thereby raising the pressure in branch 37a to one pound per square inch pressure. At this pressure, switch 34a is actuated, said switch 34a permitting starting of motor 6 by the connections: wire 49, wire 51, wire 51a, switch 34a, wire 53a, wire 54, motor 6, wire 50, and wire 48. As before noted, however, the motor is already running so switch 34a merely provides another circuit by which the motor runs. Valve 28a, being similar to valve 28, is closed but is ready to begin opening at one pound pressure. Valves 29a and 24a are both closed hence refrigerant may enter evaporator 11a through pipe 9a and expansion valve 10a, but cannot be evacuated therefrom, therefore no continuous refrigeration can take place therein. With a further increase in pressure in branch 37a to two pounds per square inch, valve 28a is partially opened and refrigerant may flow through same to the suction of compressor 3, the flow of refrigerant thereby permitting refrigeration in evaporator 11a. As the pressure in branch 37a continues to rise due to added demand, as measured by thermostat 35a, valve 28a is opened to its full capacity and if required, valves 24a and 29a are opened in the same sequence as valves 24 and 29, before described. Check valves 27a and 22a prevent reverse flow through their respective by-passes in the same manner as previously described. Should the demand at evaporator 11 be satisfied while evaporator 11a is still unsatisfied, then the operation of the system will be regulated to satisfy the demand at evaporator 11a in the same manner as was described in the operation of the system relating to evaporator 11. As before noted, the present example is given as an illustration only and is not intended to limit the scope of the invention. Other control means which permit the same sequence of operation as the above described pneumatic system may be substituted therefor.

In review, upon a demand for refrigeration at an evaporator, a compressor is started, the suction of said compressor being throttled, initially, to a no load position said suction being throttled toward open position as the load demand increases until the full capacity under the conditions of said compressor is reached. Should this capacity be inadequate to meet the demands at said evaporator, another compressor is started, said compressor being throttled as in the first example, the capacity of said second compressor being increased in response to demand as before. Additional compressors may be started or stopped in a similar manner as the demand for refrigeration varies. With a demand at more than one evaporator, the system will operate to satisfy the most extreme conditions, the refrigerant passing through any individual evaporator being throttled to meet the need of said evaporator thereby giving smooth, flexible, control of a multi-stage refrigeration system in response to the demand of any one, or more than one, evaporator from minimum to maximum capacity. The present control system involves the running of no more compressors than are needed, each compressor added to the series being run at no more than sufficient capacity in such manner that the present system provides an efficient as well as smooth control.

Figure 2:
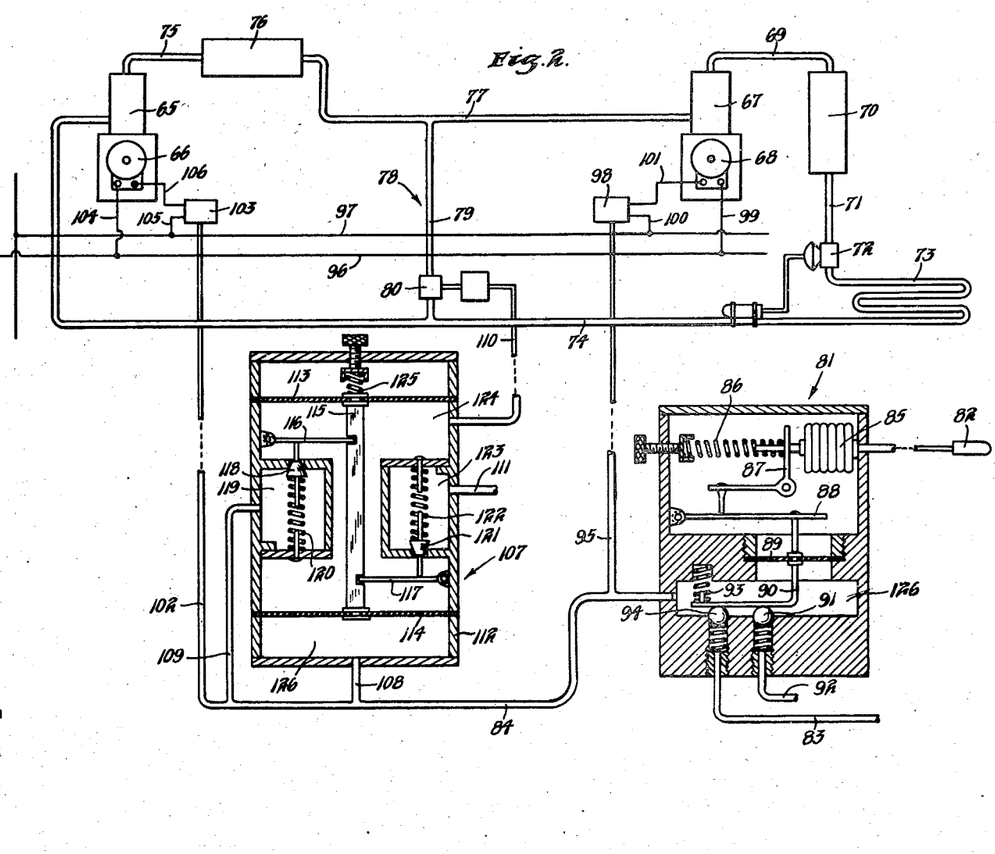
Figure 2 is a view similar to Figure 1 but showing a two stage system incorporating a modified pneumatic system.

Figure 2

Figure 2 relates to a modified plural stage refrigeration system comprising compressor 65, driven by motor 66, and compressor 67 driven by motor 68, compressor 67 discharging through pipe 69 to condenser 70, from which extends pipe 71 connecting with expansion valve 72 and evaporator 73. The outlet of evaporator 73 connects by pipe 74 to the suction of compressor 65. Compressor 65 discharges through pipe 75, intercooler 76 and pipe 77 into the suction of compressor 67. A by-pass 78 comprising pipe 79, and pressure actuated, modulating valve 80, is connected between suction pipe 74 and pipe 77. The controls comprise thermostat 81 having a 15 pounds per square inch air supply through tube 83, and controlling the pressure in branch 84.

Thermostat 81 comprises a bulb 82 which contains a volatile fluid and is connected to expansible bellows 85. Bellows 85 bears against bell-crank 87, the pressure of the bellows being resisted by adjustable spring 86. Bell-crank 87 transmits pressure due to spring 86 or bellows 85 to flexible diaphragm 89 through lever member 88, said pressure tending to move said diaphragm downwardly. Diaphragm 89 is associated with space 127, and air pressure within said space tends to move said diaphragm upwardly. An arm 90 is attached to said flexible diaphragm 89 and extends into said space 127. Arm member 90, in a balanced position of diaphragm 89, bears against valve means 91 which controls bleed outlet 92, and also bears against valve means 94, which controls air supply 83. Spring 93 assists in holding one end of arm member 90 downwardly and against valve 94 to hold same closed. Arm member 90 is so proportioned and arranged that in the balanced position of diaphragm 89, valve 91 is also held closed. Thermostat 81 controls the air pressure in branch 84, said branch 84 being connected to air space 127 of said thermostat.

Pressure switches 103 and 98, for motors 66 and 68, respectively, are connected by tubes 102 and 95 to branch 84.

A reverse acting relay 107 is connected to branch 84 by tubes 108 and 109 and controls valve 80 through tube 110. Relay 107 comprises a housing 112 having therein, spaced, flexible, diaphragms 113 and 114 connected by a longitudinal member 115, which is notched to engage pivotal levers 116 and 117. Diaphragm 113 has an effective area operator than that of 114 by an amount equivalent to the effective area of diaphragm 114. Lever 116 operates valve 118 in valve chamber 119, said valve 118 being urged closed by spring 120. Lever 117 operates valve 121, urged closed by spring 122, said valve being in valve chamber 123, which opens to the atmosphere through opening 111. The remaining space between the diaphragms, 124, connects to valve 80 through tube 110. Member 115 is normally urged downwardly by adjustable spring means 125, the motion being resisted by air pressure within space 124 and within space 126, which is connected to branch 84 by tube 108. Spring 125 is, in the present example, adjusted to maintain member 115 in its mid position when the sum of the pressures in space 124 and space 126 equals 15 pounds per square inch. When the sum of said pressures is less than 15 pounds per square inch, member 115 is driven downwardly and opens valve 118, to bleed more air into space 124 to increase the pressure therein, and to increase the total pressure opposing spring 125. When the sum of the pressures within said spaces 124 and 126 exceeds 15 pounds per square inch, member 115 is moved upwardly, thereby opening valve 121 and bleeding air out of the space 124 to decrease the total pressure opposing said spring 125. For a fuller explanation of reverse acting relay 107, reference is made to Figure 4 of Joesting Patent No. 2,286,282, issued June 16, 1942. The relation of these various parts will be brought out in the following operation schedule.

*Operation of Figure 2*

With thermostat 81 in a satisfied position, the pressure is low in bulb 82, bellows 85 is retracted, and bell-crank 87 imposes no pressure on diaphragm 89. Assuming that thermostat 81 has just reached its satisfied condition, and that air pressure exists within space 127 and connected parts of the control system; said air pressure is reduced to zero as follows: air pressure within space 127 moves diaphragm 89 upwardly, when unopposed, and tends to move member 90 off of valves 91 and 94. However, spring 93 opposes upward movement of arm 90 at one end and tends to hold valve 94 closed but permits valve 91 to open and bleed air out of the space 127 to the atmosphere. This action continues until the pressure (gauge) in space 127 is reduced to zero and diaphragm 89 asumes its normal position, in which both valves 91 and 94 are closed. With zero pressure in space 127 and connected parts of the control system, pressure switches 103 and 98 are open, and no compressors are operating.

With a modest demand for refrigeration, as measured by an increase in pressure in bulb 82, bellows 85 exerts a pressure against bell-crank 87 which is transmitted to diaphragm 89 and arm 90 and forces the same downwardly. Because of the offset relation of valves 94 and 91 to the center of diaphragm 89, and as member 90, in normal position of diaphragm 89, bears against said valves 91 and 94, motion of said diaphragm 89 downwardly results in a tipping motion of member 90, said member 90 fulcruming about valve 91 and tending to raise off of valve 94. Valve 94 is spring urged upwardly and follows said member 90 against the action of spring 93. This permits air to enter space 127 through supply 83 until pressure is sufficiently high within said space 127 to move diaphragm 89, and attached member 90, against the action of bellows 85 and bell-crank 87, to normal position, thereby stopping further bleeding of air. Assume for the present that air pressure of two pounds per square inch has been built up in space 127 and the connected control system, through branch 84. Pressure switch 98, connected to branch 84 by tube 95, is set to operate at two pounds per square inch; hence it now closes and completes a circuit starting motor 68 as follows: wire 97, wire 100, pressure switch 98, wire 101, motor 68, wire 99, and wire 96. Pressure switch 103 is set to close at 7½ pounds per square inch, hence at two pounds per square inch control pressure, said switch is open and motor 66 is not running. Pneumatically operated modulating valve 80 is normally closed and is adjusted to open in proportion to pressure between two pounds and seven and one-half pounds per square inch. Valve 80 is actuated by air supply through tube 110 from relay 107. The air pressure in space 124 being zero, and the pressure in space 126, connected to branch 84, being two pounds per square inch, member 115 is driven downwardly by spring 125 because the pressure in spaces 124 and 126 totals less than fifteen pounds per square inch. As member 115 is driven downwardly, valve 118 is opened and permits air to flow from branch 84 through tube 109, space 119, past valve 118 and into space 124. As the air bled into space 124 is at only two pounds per square inch pressure, the total pressure of spaces 124 and 126 remains less than fifteen pounds per square inch, and member 115 remains in its downward position, thus putting branch 84 into direct communication with valve 80 by the circuits: branch 84, tube 109, space 119, space 124, tube 110, valve 80. As valve 80 only starts to open at two pounds per square inch pressure, it is still closed, and compressor 67, driven by motor 68, is running under conditions of no load due to closed suction means.

With an increase in pressure in branch 84, due to a demand by thermostat 81, valve 80 will be proportionately opened, compressor 67 will be running under load and refrigeration will be provided. Assume that the demands for refrigeration, as measured by thermostat 81, has increased the branch air pressure to six pounds per square inch in the same manner as previously described. Spring 125 is now resisted by a pressure of six pounds per square inch in space 126 and six pounds per square inch in 124 but as the sum of these pressures is still less than fifteen pounds per square inch, spring 125 still dominates the position of member 115 and keeps same in a downward position. Communication still exists between branch 84 and tube 109, space 119, space 124, tube 110 and valve 80. At six pounds per square inch, valve 80 is more widely open, and compressor 67 is operating under conditions of heavier loading.

When the pressure in branch 84 rises to seven and one-half pounds per square inch, due to increased demands for refrigeration, as measured by 81, the air pressure in space 126 and space 124 rises to the same value. At this point, however, the sum of the pressure in spaces 126 and 124 equals fifteen pounds per square inch and balances the force due to spring 125. Member 115 therefore moves to an intermediate position and both valve 118 and 121 are closed. Valve 80, due to its 7½ pounds per square inch pressure, is fully opened and compressor 67 is operating at full capacity, for single operation. However, at this pressure, switch 103 completes a circuit between a source of current and motor 66 as follows: wire 97, wire 105, pressure switch 103, wire 106, motor 66, wire 104, and wire 96, thereby placing the compressor 65 into operation. This compressor adds little, if any, capacity to the system because the pressure in 77 cannot rise due to open valve 80.

With an increase in branch pressure to 8 pounds per square inch, due to further demands for refrigeration, as measured by thermostat 81, the pressure in space 126 rises to 8 pounds per square inch. As the sum of the pressures in spaces 124 and 126 now exceeds fifteen, member 115 is driven upwardly and opens valve 121, thereby bleeding air out of space 124 to the atmosphere. This action continues until the pressure in space 124 is reduced to a value, which, added to the 8 pounds per square inch of space 126, equals said fifteen. In this case, the pressure in 124 will be reduced to 7 pounds per square inch before member 115 is again moved back to its mid position and both valves 118 and 121 are closed. With the reduction in pressure in space 124, valve 80 is partially closed, thereby restricting return flow through by-pass 78. As return flow through by-pass 78 is restricted, compressor 65 assumes load and the system capacity is thereby increased.

With a further rise in branch pressure to ten pounds per square inch, the total pressure in spaces 126 and 124 again overcomes the spring 125, and 115 is moved upwardly. The upward movement of member 115 opens valve 121 and bleeds air out of space 124 until the pressure therein, added to the pressure in space 126, equals fifteen, at which point the pressures are balanced by spring 125 and member 115 is again moved to its mid position. With ten pounds per square inch pressure in space 126, the pressure in space 124 becomes five pounds per square inch, and valve 80 is proportionately closed. Compressor 65 now carries a greater share of the load, due to less gas passing through by-pass 78, and compressor 67 carries added load due to the increased pressure in suction 77, hence the system capacity is increased.

When the pressure in branch 84, due to action of thermostat 81, rises to fifteen pounds per square inch pressure, the pressure in space 124 is bled to zero to offset the increase in pressure in space 126. At zero pressure, valve 80 is closed, and compressors 65 and 67 are operating in series and delivering full capacity.

Reviewing the operation of Figure 2, note that an initial demand starts a compressor under conditions of no load and then throttles the suction to permit the compressor to meet the demands, if possible. If the demand be excessive for one compressor, another is started, but operates initially with no capacity because of an open by-pass. As the demand rises, this by-pass is throttled towards closed position until the net capacity of the two machines satisfies the load requirements. Obviously, additional compressors may be provided in this system, being connected in the manner suggested. The specific pressures mentioned in the above description are considered illustrative only and any suitable pressures may be used. It is well known that control means of the sort described have operating differentials but these have been ignored to simplify the description.

It will be further noted that this arrangement provides a pneumatic control system of general utility in which a power means or motor means (valve 80) is caused to gradually move from a first position to a second position and back again upon a change in the main air pressure from zero to fifteen pounds per square inch.

In the following Figure 3, it will be shown how this same sequence of operation may be obtained by electrical means.

Figure 3:
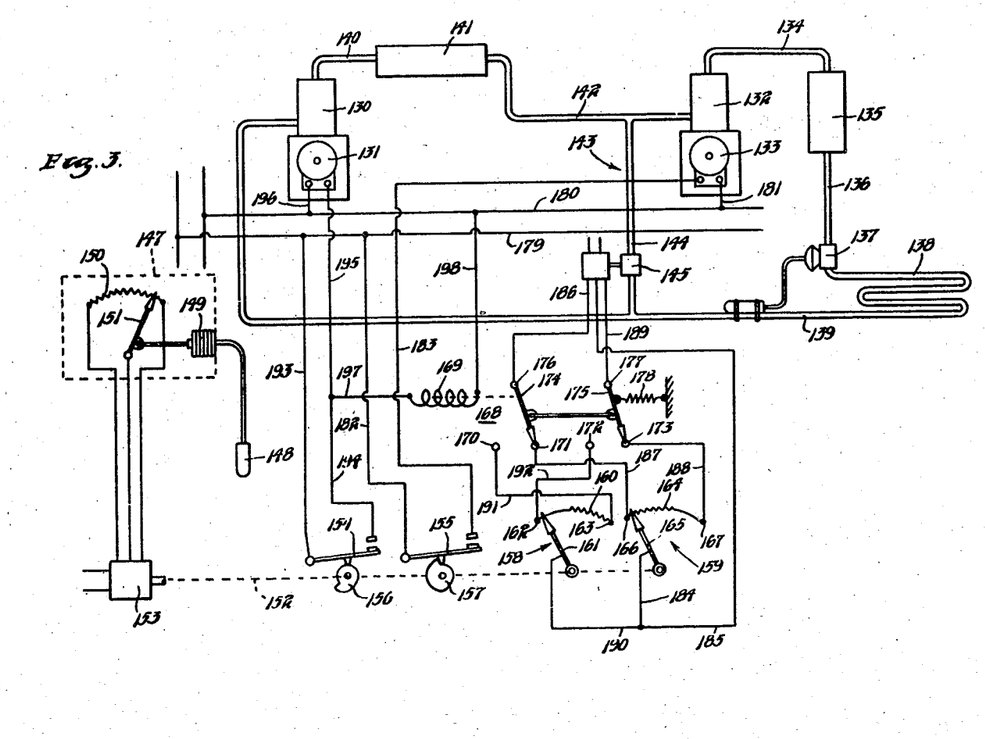
Figure 3 shows a refrigeration system similar to that of Figure 2 but using electric instead of pneumatic control.

*Figure 3*

Figure 3 shows the same refrigeration system as Figure 2 but with an electrical instead of a pneumatic control system. Refrigerating units 130 to 145 correspond to, and are connected in the same manner as, respectively, units 65 to 80 in Figure 2. Of these units, only valve 145 is different from its counterpart, valve 145 being an electrically operated modulating valve whereas valve 80 is a pneumatically operated modulating valve. Electrical controlling means for Figure 3 comprises a modulating controller 147 including temperature responsive means 148 and 149, movable arm 151, and potentiometer coil 150, said controller regulating a modulating step controller 152, having motor 153, said motor being similar to that described in Patent No. 2,028,110, issued January 14, 1936, to D. G. Taylor. Step controller 152 has two switches, 154 and 155, operated by cams 156 and 157, respectively, and also includes a pair of potentiometers 158 and 159. Potentiometer 158 has a coil 160, arm 161, and terminals 162 and 163. Potentiometer 159 has coil 164, arm 165, and terminals 166 and 167. A double-throw two wire relay 168 is provided having a coil 169 and switch terminals 170, 171, 172, 173, 176, 177, and switch blades 174 and 175. Valve 145 is controlled by a modulating electric motor of the same type as 153. Valve 145 is normally closed and switch arms 174 and 175 of relay 168 are normally biased to the right by spring 178.

*Operation of Figure 3*

Under stand-by conditions, controller 147 is in its satisfied position, expansible bellows 149 are retracted, arm 151 is at the extreme right of coil 150, step controller 152 is at its extreme counter-clockwise rotative position and switches 154 and 155 are open. Upon a rise in temperature, bellows 149 expands, moving arm 151 to the left; and step controller 152, to match the movement of 151, moves clockwise. A predetermined initial clockwise movement of cam 157 closes switch 155 which starts motor 133 as follows: wire 179, wire 182, switch 155, wire 183, motor 133, wire 181, and wire 180.

The initial movement of the step controller also moves arms 161 and 165, of potentiometers 158 and 159, respectively, in a clockwise direction. Because of the biased position of relay 168, only potentiometer 159 is active. Potentiometer coil 164 has the same resistance as the coil in the modulating motor of valve 145 but has its resistance all arranged to be swept by the first half of the full travel of arm 165 so that half the full clockwise motion of step controller 152 will modulate valve 145 from closed to fully open position. The circuit controlling the modulating valve 145 comprises: arm 165, wire 184, wire 185, valve 145, wire 186, terminal 176, arm 174, terminal 171, wire 187, terminal 166, coil 164, terminal 167, wire 188, terminal 173, arm 175, terminal 177, wire 189, and valve 145. Thus it will be seen that as the temperature rises at 148, and arm 151 moves toward its mid-position, compressor 133 is placed in operation and its operation is regulated by valve 145 which is opened in response to increased demand up to a wide open position when arm 151 is at the mid-point of its travel.

Upon the step controller being driven through more than half its clockwise motion, to keep step with increased demand of controller 147, cam 156 closes switch 154 to start motor 131, the circuit being: wire 179, wire 193, switch 154, wire 194, wire 195, motor 131, wire 196, and wire 180.

Relay 168 is also activated by switch 154 as follows: wire 179, wire 193, switch 154, wire 194, wire 197, coil 169, wire 198 and wire 180. When coil 169 is energized, switch arms 174 and 175 are moved to the left and potentiometer 158 is placed in command of valve 145. Coil 160 of potentiometer 158 is like coil 164 in having the same resistance as the coil in modulating valve 145 but having all its resistance in the latter half of the travel of arm 161. The controlling circuit for valve 145 with potentiometer 158 in command is: arm 161, wire 190, wire 185, valve 145, wire 186, terminal 176, switch arm 174, terminal 170, wire 191, terminal 163, coil 160, terminal 162, wire 192, terminal 172, arm 175, terminal 177, wire 189, and valve 145.

Note that coil 160 is connected reverse to 164 so that relative to terminals 176 and 177, clockwise movement of arm 161 results in decreased resistance on the control side of the terminal 176 whereas if coil 164 were used, the same direction of motoin of arm 165 would result in an increase of resistance on the side of terminal 176. It will thus be seen that as the step controller advances through the latter half of its clockwise travel, valve 145 is modulated towards closed position. As stated in the operation of Figure 2, full capacity is reached when both compressors 130 and 132 are in operation and valve 145 is closed.

As in the system of Figure 2, additional stages may be provided by connecting the compressors in series, as shown, providing a by-pass for each pair of compressors and providing modulating valve control of each by-pass, the travel interval of the step controller being divided by the number of stages used and suitable switches and relays provided for said additional stages, as herein suggested.

Note that here, as in the previous example, the output of a plural stage refrigeration system may be varied from zero to one hundred per cent of its capactiy in an effective and practical manner and that the system comprises standard and readily available units for both refrigeration and control. Further, as noted in the above examples, the present invention comprises a controlled fluid pumping system hence the present system of control is considered to be of utility in multi-stage fluid pumping systems generally.

The above examples are intended to be illustrative only of the present invention and are not to be considered as limiting the scope of the invention, such being determined by the following claims.

I claim as my invention:

1. In a refrigeration system, first and second compressors, means connecting the discharge means of the first compressor with the suction means of the second, conduit means connecting the discharge means of the second compressor to a condenser, expansion valve and an evaporator, main suction means connecting the outlet of the evaporator to the suction means of the first compressor; by-pass means including a throttling valve connected between the main suction means and the means connecting the discharge means of the first compressor and the suction of the second compressor; control means for starting the second compressor, upon an initial demand for refrigeration, and for opening said throttling valve increasingly as the demand upon the second compressor increases, said control means starting said first compressor when the load demand exceeds the capacity of the second compressor, and means restricting return flow through said by-pass means toward said main suction means.

2. In a refrigeration system, first and second compressors, means connecting the discharge means of the first compressor with the suction means of the second, conduit means connecting the discharge means of the second compressor to a condenser, expansion valve and an evaporator, main suction means connecting the outlet of the evaporator to the suction means of the first compressor; by-pass means including a throttling valve connected between the main suction means and the means connecting the discharge means of the first compressor and the suction of the second compressor; control means for starting the second compressor, upon an initial demand for refrigeration, and for opening said throttling valve increasingly as the demand upon the second compressor increases, said control means starting said first compressor when the load demand exceeds the capacity of the second compressor, and check valve means restricting return flow through said by-pass means toward said main suction means.

3. In a refrigeration system, first and second compressors, means connecting the discharge means of the first compressor with the suction means of the second, conduit means connecting the discharge means of the second compressor to a condenser, expansion valve and an evaporator, main suction means connecting the outlet means of the evaporator to the suction means of the first compressor; by-pass means including a throttling valve connected between the main suction means and the means connecting the discharge means of the first compressor and the suction of the second compressor; control means for starting the second compressor, upon an initial demand for refrigeration, and for opening said valve increasingly as the demand upon the second compressor increases, said control means starting said first compressor when the load demand exceeds the capacity of the second compressor, said valve being increasingly closed as the load demand on the second compressor increases.

4. In a refrigeration system, a plurality of compressors, conduit means connecting said compressors in series, with the outlet means of one being connected to the inlet means of another, a condenser connected to the outlet means of the high pressure compressor in the series, a plurality of evaporators connected to said condenser, conduit means connecting each evaporator to the inlet means of the lowest pressure compressor in the series, by-pass means connecting the suction means of each evaporator with the means connecting a pair of compressors, a throttling valve and a check valve in each by-pass, said check valves permitting flow only in a direction towards said compressors, and control means responsive to a condition affected by said evaporators connected to sequentially control the by-pass valves associated with the evaporators and to sequentially control said compressors.

5. In a refrigeration system, means connecting a plurality of compressors in series including conduit means connecting the outlet means of one compressor to the inlet means of the next higher pressure compressor, the highest pressure compressor of the series discharging through a condenser, said condenser supplying liquid refrigerant to a plurality of evaporators, suction means connecting each of said evaporators to the inlet means of the low pressure compressor of the series; and individual by-pass means connected to the suction means of each evaporator and the conduit means connecting each pair of compressors, each by-pass means being valve controlled.

6. In a refrigeration system, conduit means connecting a plurality of compressors in series, the highest pressure compressor of the series discharging through a condenser, said condenser supplying liquid refrigerant to a plurality of evaporators, suction means connecting each of said evaporators to the inlet means of the lowest pressure compressor in the series; separate by-pass means connected at one end to the means connecting each pair of compressors and connected at the other end to the suction means of an evaporator, each by-pass means being valve controlled; and control means comprising means responsive to a condition affected by operation of said evaporators and connected for controlling the operation of the compressors in sequence, the highest pressure compressor being started first, said control means also operating said by-pass valves in sequence, the valve associated with the inlet of the highest pressure compressor being opened first.

7. In a fluid pumping system, conduit means connecting a plurality of individually driven pumping units in series, the discharge of one unit being connected to the intake of the next adjacent unit, the intake of the low pressure end of the series comprising main suction means and the discharge of the high pressure end of the series comprising main discharge means; intervening suction means connected with the means connecting each pair of pumping units, each of said intervening suction means being valve controlled; control means responsive to load demands causing operation of said pumping units in sequence starting with the discharge end of said series, said control means also operating said valves in similar sequence, said valve control means restricting return flow through each of said intervening means as additional valves are opened.

8. In a system for compressing a fluid, conduit means connecting a plurality of compressors in series, one end of said series comprising main discharge means and the other end of the series comprising main suction means, a by-pass associated with each pair of connected compressors, each by-pass by-passing all lower pressure compressors; valve control means for each by-pass, and control means for operating said valve means in sequence in response to a load demand, each of said valve means restricting a return flow through its by-pass as each additional valve is opened.

9. In a system for compressing a fluid, conduit means connecting a plurality of individually driven compressors in series, one end of said series comprising main discharge means and the other end of the series comprising main suction means; a by-pass associated with each pair of connected compressors, each by-pass by-passing all lower pressure compressors; valve control means for each by-pass; control means responsive to load demands for operating said valve means and for starting said compressors in sequence, the higher pressure compressor being started first and the valve in the by-pass associated with the suction of said higher pressure compressor being opened first, and flow control means rendering inoperative each by-pass as the compressor whose discharge means is associated with said by-pass reaches full capacity.

10. Compressing means comprising first, second, and third compressors, each being individually driven, the discharge means of the first connecting with the suction means of the second, the discharge means of the second connecting with the suction means of the third, and the third compressor discharging into main discharge means, the suction means of the first compressor comprising main suction means, first by-pass means including a throttling valve connecting said main suction means and the discharge means of the first compressor, second by-pass means including a throttling valve connecting said main suction means and the discharge means of said second compressor; and control means responsive to refrigeration demands by which, upon an initial and increasing demand, said third compressor is started and the valve of said second by-pass means is proportionately opened, upon a demand in excess of the capacity of said third compressor said second compressor is started and the valve of said first by-pass means is proportionately opened, and upon demands in excess of the capacity of said two compressors said first compressor is started.

11. In a refrigeration system, conduit means connecting two individually driven compressors in series; valve controlled by-pass means connecting the suction means and discharge means of one of the compressors; control means comprising a modulating controller, a modulating device operated by and in step with said controller, the initial movement of said device from one extreme position, upon operation by said controller, operating means to start a compressor, a predetermined movement of said device starting the second compressor, said device also controlling modulating means governing said valve, said valve being proportionately opened as the load is increased on the first compressor started, and relay means controlled by said device for reversing the action of said valve upon said predetermined movement of said device, the valve being proportionately closed as said predetermined movement is exceeded.

12. In a system for compressing a fluid, conduit means connecting two compressors in series, a by-pass connection which diverts the flow of fluid around the lower pressure compressor and directs it to the intake of the higher pressure compressor, valve means in said by-pass connection, control means progressively opening said valve means in response to an increase in demand when the high pressure compressor only is operating, and control means for starting said second compressor when said valve means has reached the wide open position.

13. In a system for pumping a fluid, conduit means connecting two individually driven pumping units in series, a by-pass connection which diverts the flow of fluid around one pumping unit and directs it to the intake of the other pumping unit, valve means in said by-pass connection, control means to progressively open said valve means in response to an increase in demand when the other pumping unit is operating, and to start the one pumping unit when said valve means is wide open, said control means progressively closing said valve means in response to an increase in demand when both said pumping units are operating.

14. A fluid pumping system comprising two pumping units connected in series; throttling valve controlled means by-passing one of said pumping units; control means for starting a pumping unit and proportionately opening said valve until the valve is fully open, then starting the second pumping unit, and switching means reversing the effect of the control means on the throttling valve so that the valve is proportionately closed as the demand on the second pumping unit is increased.

15. A fluid compressing means comprising two individually driven compressors connected in series; valve controlled by-pass means connected to the suction means and discharge means of one of the compressors; a control means supplying air under pressure in accordance with load conditions, a first pressure switch constructed and arranged to start a first compressor upon an initial increment of air pressure, a second pressure switch constructed and arranged to start the second compressor at a predetermined air pressure, said valve being opened in proportion to the air pressure increase until a pressure is reached near said predetermined pressure, and relay means reversing the effect of further increased air pressure and causing said valve to close in proportion to said further increased air pressure.

16. In a refrigeration system, conduit means connecting first, second and third compressors in series, conduit means connecting the third compressor to a condenser, expansion valve and an evaporator, main suction means connecting the outlet of the evaporator to the suction means of the first compressor; first intervening conduit means connecting said main suction means and the means connecting the first and second compressors, second intervening conduit means connecting said main suction means and the means connecting the second and third compressors, each of said intervening conduit means including a throttling valve; and control means comprising means for starting said third compressor upon an initial demand for refrigeration, said control means also controlling the throttling valve in said second intervening conduit means, said valve being increasingly opened in accordance with added demand on said third compressor; said control means starting the second compressor upon a demand in excess of the capacity of the third compressor, said control means throttling the valve in first intervening conduit means, and means restricting reverse flow through the second intervening conduit means toward said main suction means; said control means, upon a demand for refrigeration in excess of the capacity of said second and third compressors, starting said first compressor, and valve means restricting return flow through said first intervening conduit means toward said main suction means.

17. In a fluid pumping system, conduit means connecting first, second, and third individually driven compressors in series, the discharge means of the first compressor being connected to the suction means of the second, the discharge means of the second being connected to the suction means of the third, the discharge means of the third compressor comprising main discharge means, and main suction means associated with the suction means of the first compressor; first intervening conduit means comprising a normally closed throttling valve and a check valve, said conduit means being connected to the main suction means and to the means connecting the discharge means of the first compressor and the suction means of the second compressor, second intervening means including a normally closed throttling valve and a check valve connected between said main suction means and the means connecting the discharge means of the second compressor and the suction means of the third compressor, and normally closed throttling valve means in the suction means of the first compressor; control means comprising a supply of air under uniform pressure, a controller responsive to load conditions regulating the pressure of air in a control branch in response to the said conditions, a pressure switch operative at a low branch pressure to start the third compressor, a second pressure switch operative at a higher branch pressure to start said second compressor and a third pressure switch operative at a still higher branch pressure to start said first compressor, the valve in said second intervening conduit means being adjusted to be gradually opened with increase of branch pressure and to reach full open position at the pressure required to start the second compressor, the valve in the first intervening conduit means being adjusted to start opening at the pressure required to start the second compressor and to reach full open position at the pressure required to start the first compressor, the valve in the suction of the first compressor being adjusted to start opening at the pressure required to start the first compressor and to be fully open at the maximum pressure in the control branch, and limit control means preventing operation of the first and second compressors in the event of high suction pressures for same.

18. In a refrigerating system, conduit means connecting a plurality of individually driven compressors in series, the discharge means of one compressor being connected to the intake means of the next adjacent compressor, the intake means of the low pressure end of the series comprising main suction means and the discharge means of the high pressure end of the series comprising main discharge means; intervening suction means connected with the means connecting each pair of compressors and the main suction means, each of said intervening suction means being valve controlled; control means responsive to demands for refrigeration causing operation of said compressors in sequence starting with the discharge end of said series, said control means also operating said valves in similar sequence, said valve control means restricting return flow through each of said intervening means toward the main suction means as additional valves are opened.

19. In a fluid pumping system, conduit means connecting two individually driven compressors in series; valve controlled by-pass means connecting the suction means and discharge means of one of the compressors; control means comprising a modulating controller, a modulating device operated by and in step with said controller, the initial movement of said device from one extreme position, upon operation by said controller, operating means to start a compressor, a predetermined movement of said device starting the second compressor, said device also controlling modulating means governing said valve, said valve being proportionately opened as the load is increased on the first compressor started, and switching means controlled by said device for reversing the action of said valve upon said predetermined movement of said device, the valve being proportionately closed as said predetermined movement is exceeded.

20. In a refrigerating system, conduit means connecting first, second, and third individually driven compressors in series, the discharge means of the first compressor being connected to the suction means of the second, the discharge means of the second being connected to the suction means of the third, the discharge means of the third compressor comprising main discharge means, and main suction means connected to the suction means of the first compressor; first intervening conduit means comprising a normally closed throttling valve and a check valve in series therewith, said conduit means being connected to the main suction means and to the means connecting the discharge means of the first compressor and the suction means of the second compressor, second intervening means including a normally closed throttling valve and a check valve in series connected between said main suction means and the means connecting the discharge means of the second compressor and the suction means of the third compressor, and normally closed throttling valve means in the suction means of the first compressor; control means comprising a supply of air under uniform pressure, a controller responsive to refrigeration demand for regulating the pressure of air in a control branch in response to said refrigerating demand, a pressure switch operative at a low pressure in said branch to start the third compressor, a second pressure switch operative at a higher pressure to start said second compressor and a third pressure switch operative at a still higher pressure to start said first compressor, the valve in said second intervening conduit means being adjusted to be gradually opened with increase of branch pressure and to reach full open position at the pressure required to start the second compressor, the valve in the first intervening conduit means being adjusted to start opening at the branch pressure required to start the second compressor and to reach full open position at the pressure required to start the first compressor, the valve in the suction means of the first compressor being adjusted to start opening at the pressure required to start the first compressor and to be fully open at the maximum pressure in the control branch, and control means preventing operation of the first and second compressors in the event of high suction pressures for the same.

WILLIAM L. McGRATH.

REFERENCES CITED

The following references are of record in the file of this patent:

UNITED STATES PATENTS

| Number | Name | Date |
|---|---|---|
| 1,224,661 | Parker | May 1, 1917 |
| 1,753,280 | Baumann | Apr. 8, 1930 |
| 2,035,814 | Kallam | Mar. 31, 1936 |
| 2,057,101 | Kagi | Oct. 13, 1936 |
| 2,165,741 | Wolfert | July 11, 1939 |
| 2,295,775 | Crittenden | Sept. 15, 1942 |
| 2,344,215 | Soling et al. | Mar. 14, 1944 |

FOREIGN PATENTS

| Number | Country | Date |
|---|---|---|
| 14,944 | Great Britain | Nov. 8, 1906 |

Certificate of Correction

Patent No. 2,453,095. November 2, 1948.

WILLIAM L. McGRATH

It is hereby certified that errors appear in the above numbered patent requiring correction as follows:

In the drawings, Sheet 2, Fig. 2 should appear as shown below instead of as in the patent— column 4, line 60, after the words "from pipe" insert the numeral 12;

and that the said Letters Patent should be read with these corrections therein that the same may conform to the record of the case in the Patent Office.

Signed and sealed this 15th day of March, A. D. 1949.

[SEAL]

THOMAS F. MURPHY,
*Assistant Commissioner of Patents.*